US006682282B2

United States Patent
Allen

(10) Patent No.: US 6,682,282 B2
(45) Date of Patent: Jan. 27, 2004

(54) RACK MOUNT PANEL FASTENER WITH INTERCHANGEABLE THREAD SIZE

(75) Inventor: Joseph R. Allen, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/966,640

(22) Filed: Sep. 28, 2001

(65) Prior Publication Data

US 2003/0063960 A1 Apr. 3, 2003

(51) Int. Cl.[7] .................................................. F16B 41/00
(52) U.S. Cl. ........................... 411/353; 411/999; 211/26
(58) Field of Search ................................. 411/352, 353, 411/107, 999; 211/26; 312/2, 23.2, 265.4; 361/683

(56) References Cited

U.S. PATENT DOCUMENTS

| 2,919,736 | A | * | 1/1960 | Kann |
| 3,126,935 | A | * | 3/1964 | Tuozzo |
| 3,138,188 | A | * | 6/1964 | Tuozzo |
| 3,195,600 | A | * | 7/1965 | Middleton |
| 3,343,581 | A | * | 9/1967 | Martin |
| 3,346,032 | A | * | 10/1967 | Gulistan |
| 3,502,130 | A | * | 3/1970 | Gulistan |
| 4,915,557 | A | * | 4/1990 | Stafford |
| 5,209,356 | A | * | 5/1993 | Chaffee |
| 5,312,005 | A | * | 5/1994 | Odell |
| 5,338,139 | A | * | 8/1994 | Swanstrom |
| 5,544,992 | A | * | 8/1996 | Ciobanu et al. |
| 6,279,754 | B1 | * | 8/2001 | Hoss |

FOREIGN PATENT DOCUMENTS

GB                125200      * 4/1919

* cited by examiner

*Primary Examiner*—Flemming Saether

(57) ABSTRACT

A rack mount panel fastener system which allows thread size to be changed quickly and without tools. A thumbscrew is held in position in a ferrule attached to a server front panel by a removable retainer. The thumbscrew has a knurled head on one end, a threaded section on the end of its shaft and a reduced diameter section intermediate the threaded end and the head. The ferrule has an inner flange through which the retainer may not pass. The retainer is threaded onto and past the threaded section of the shaft to hold the thumbscrew in the ferrule. Thread size may be changed by manually removing the retainer without tools and replacing the thumbscrew and retainer with a new thumbscrew and new retainer having the desired thread size.

7 Claims, 3 Drawing Sheets

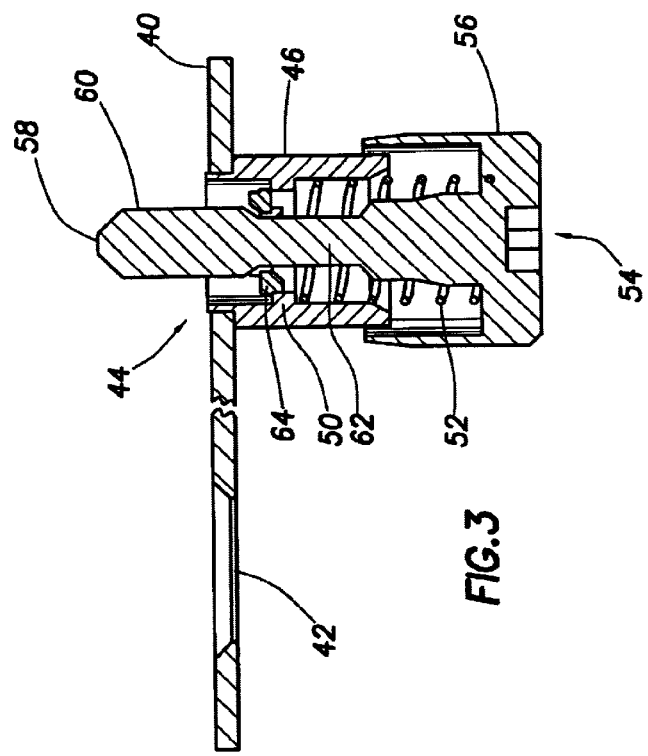
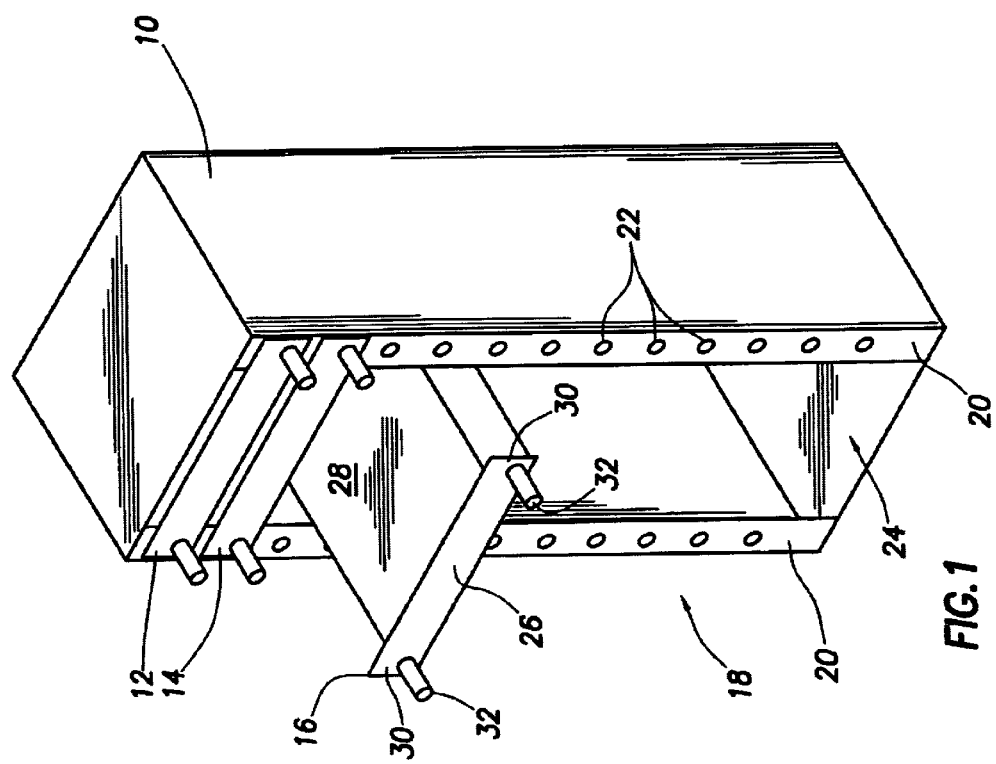

RACK MOUNT PANEL FASTENER WITH INTERCHANGEABLE THREAD SIZE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to rack mounted computer systems and more particularly to an improved panel fastener system which allows screw thread size to be changed rapidly without tools.

2. Background of the Invention

It is becoming common for businesses to use large numbers of computer servers. For example, Internet service providers may need hundreds or even thousands of servers. Websites are operated by servers. The more successful the website, the more servers it requires. When hundreds or thousands of servers are to be located on one premises, they need to be adapted for rack mounting to save space and provide for convenient routing of power and signal cables.

The companies using such servers typically have spent considerable amounts of money on the facilities to mount and interconnect the servers. These facilities include the racks to mechanically support the servers and power and signal cabling needed to power and interconnect the servers. There are several different "standard" thread sizes used in the threaded holes used for mechanically attaching a server to a rack. Servers are normally manufactured with front panel thumbscrews which are intended to allow quick and easy mechanical mounting of the servers in racks. But if the thumbscrew thread is different from the rack hole thread, either the thumbscrew must be replaced or the rack modified to accept the new thread size.

One way of solving this problem is to drill out the original rack holes and tap the new thumbscrew thread size into the holes. This requires several tools and a considerable amount of time. It will only work if the new thread size is larger than the old size. It also produces metal shavings or particles which represent an electrical and mechanical hazard in a computer room. Servers are normally manufactured with thumbscrew assemblies permanently mounted into the front panel of the servers. Each thumbscrew is permanently, but rotatably, held within a ferrule. The ferrule is typically permanently attached to the front panel by pressing, swaging or flaring. In the past, thumbscrews with English system thread sizes, such as 10-32 thread size, were commonly used and racks were therefore manufactured with a matching thread. However, a more modern standard for rack mounted servers is the metric thread configuration, such as M6. As a result, it is common for a customer to find that new servers are delivered with the M6 thread size, but all of its racks have the 10-32 thread size. Any effort to remove the M6 thumbscrew assembly requires removal of its ferrule which means breaking what was intended to be a permanent press fit, etc. bond. Doing so is very likely to damage the server front panel so that a new thumbscrew assembly cannot be installed even if the necessary pressing or swaging tools are available. In that case, the server cannot be mounted in a rack and the server may no longer be useful to the customer.

It would be desirable to provide a panel fastener system which allows screw thread size to be changed rapidly without tools and without damage to a server front panel or the rack.

BRIEF SUMMARY OF THE INVENTION

According to the present invention, a panel fastener system is provided that includes a ferrule coupled to a server front panel, a screw positioned within the ferrule and a retainer which may be manually threaded onto the threaded end of the thumbscrew and which holds the thumbscrew within the ferrule.

It may be preferable for the system to include a plurality of screws, each having a different standard thread and a retainer for each screw size.

An embodiment includes a method of swapping panel fasteners by: turning a screw to remove a retainer, removing the screw from the ferrule, placing a new screw within the ferrule, placing a new retainer on the threaded end of the new screw and manually turning the new screw to attach the retainer to the screw.

If preferred, the screws may be thumbscrews which may be turned manually without need for any tools.

BRIEF DESCRIPTION OF THE DRAWINGS

For a detailed description of embodiments of the invention, reference will now be made to the accompanying drawings.

FIG. 1 is a perspective view of an equipment rack with several computer servers mounted in the rack and one being installed;

FIG. 3 is a cross-sectional illustration of a panel fastener system in one embodiment of the present invention;

NOTATION AND NOMENCLATURE

Figure 2:
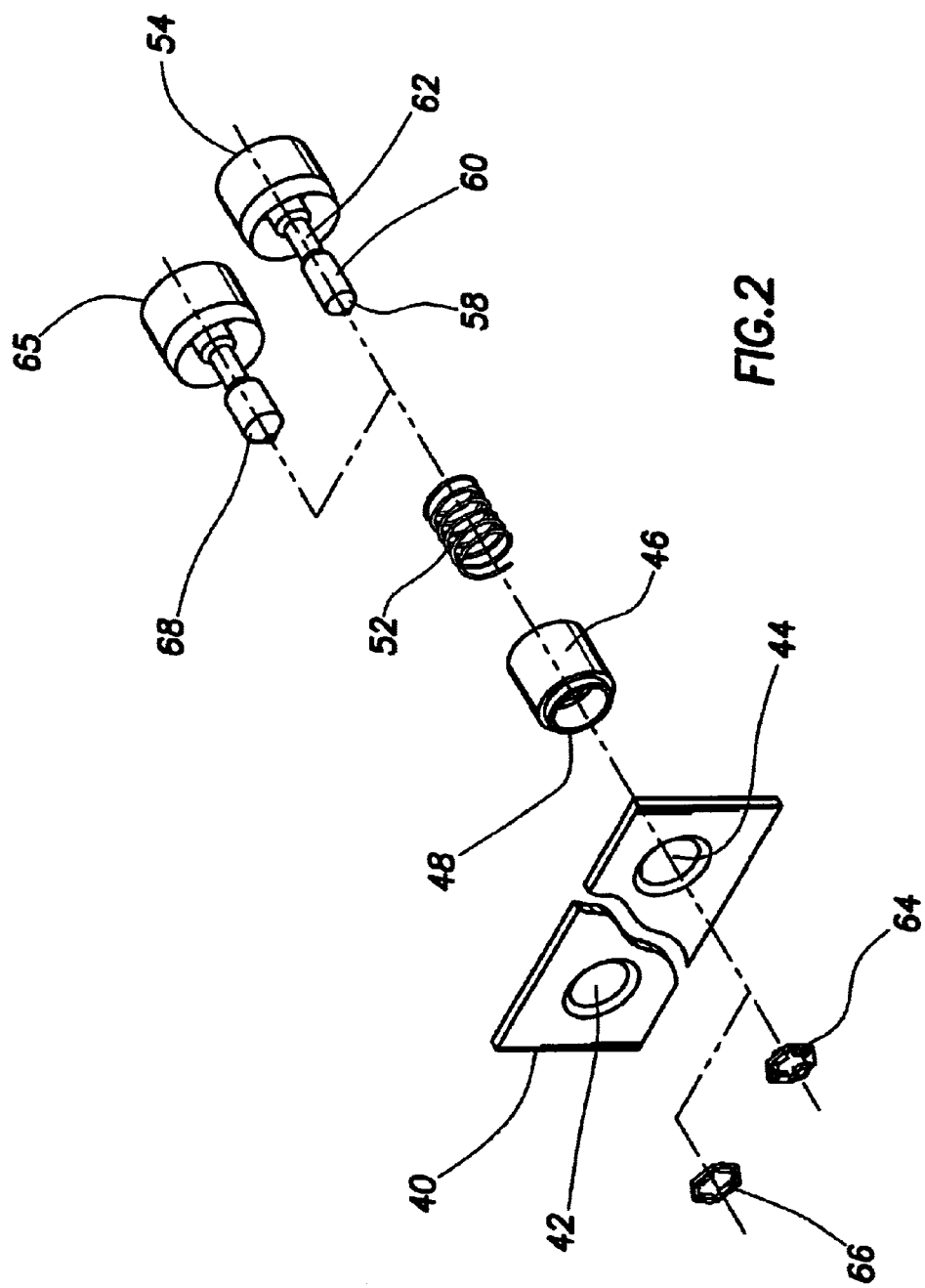
FIG. 2 is an exploded view of a panel fastener system in one embodiment of the present invention.

Certain terms are used throughout the following description and claims to refer to particular system components. As one skilled in the art will appreciate, companies may refer to a component by different names. This document does not intend to distinguish between components that differ in name, but not function. In the discussion herein and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

Referring now to FIG. 1, a typical rack mounting system for computer servers is illustrated. A mounting rack 10 is a generally rectangular metal housing for providing mechanical support for a number of servers 12, 14 and 16. The front surface 18 of the rack 10 includes two vertical rails 20 having a plurality of threaded holes 22 for attaching equipment such as the servers 12, 14, 16. The holes are normally spaced vertically apart by 1.75 inch which is the standard unit of server height usually referred to as one "U". Servers are normally made in thicknesses which are multiples of this unit, e.g., 1U, 2U, 3U, etc. The holes are sized and threaded for one of the standard screw thread configurations such as English standard 10-32, i.e., screw size 10 with 32 threads per inch. Between the rails 20 is an opening 24 for receiving components such as servers 12, 14, 16. Mounting racks are typically identified by their nominal width dimension. For example, a nineteen inch rack accepts components having a front panel maximum width dimension of nineteen inches and has an opening width of about 17.5 inches for the actual chassis of the component, e.g., server 16.

In FIG. 1, server 16 is illustrated as partly installed into rack 10. It has a front panel 26 which is wider than its chassis 28. For example the front panel 26 may be nineteen inches wide and the chassis 28 may be 17.5 inches wide. The extra width of the front panel 26 forms two flanges or ears 30 for mechanically coupling the server 16 to the rack 10. A thumbscrew 32 is coupled to each ear 30. When server 16 is placed into final position within rack 10, the thumbscrews 32 mate with respective holes 22 and may be manually turned to removably hold the server 16 in place.

This rack mounting system allows fast installation of servers into racks, unless the thread sizes of the thumbscrews 32 do not match the threads of the holes 22. The panel fastener system of the present invention allows the thumbscrews 32 to be quickly replaced with thumbscrews which match any rack hole thread, typically without damaging the server panel and without use of any tools.

FIG. 2 is an exploded view of an embodiment of the panel fastener system of the present invention. FIG. 3 is a cross sectional view of an assembled panel fastener. With reference to both FIGS. 2 and 3, the panel fastener system will be described. A panel 40, which may be the front panel 26 of server 16 of FIG. 1, has two holes for receiving thumbscrew fasteners. The illustrated portions of panel 40 represent the ear portions of the panel. Panel 40 may be one continuous piece of metal or may be separate ear pieces which may be coupled to the front surface or sides of a server chassis. The panel 40 as illustrated is for a 1Userver and therefore has one fastener on each side. Larger servers having vertical height of 10U or greater will normally have two or more fasteners on each flange to provide a stronger mounting to the rack. A ferrule 46 has a reduced diameter portion on a first end 48 sized to fit holes 42, 44 in panel 40. The holes 42, 44 are preferably tapered or countersunk as illustrated so that the reduced diameter portion 48 of ferrule 46 may be flared into the holes 42, 44 to securely couple the ferrule 46 to the panel 40. Ferrule 46 has an inner flange or reduced diameter portion 50 (best seen in FIGS. 3 and 5). A coil spring 52 is sized to fit within a second end of ferrule 46 and rest on the flange 50.

A thumbscrew 54 has a head portion 56, preferably knurled on its circumference, and a shaft 58. Knurling provides a non-slip or slip resistant gripping surface for manual turning of the thumbscrew. If desired, a molded rubber or plastic surface may be applied to the circumference of the head 56 to provide a gripping surface. The head portion 56 is cup shaped to receive one end of spring 52 and to surround ferrule 46 and spring 52 when screwed into a rack hole. The shaft 58 includes a threaded portion 60 on the end opposite head 56 and a reduced diameter portion 62 between the threaded portion 60 and the head 56. The threaded portion 60 carries threads in one of the standard rack mount sizes, such as 10-32 or M6. The head portion 56 may also include a screwdriver slot to allow the screw to be turned by a standard flat blade or Phillips screwdriver to allow installation or final tightening with tools.

A retainer 64 has a thread engaging hole sized to engage the threaded section 60 of thumbscrew 54. However, the reduced diameter section 62 of shaft 58 is small enough that the retainer 64 may slide and turn freely on section 62. As illustrated in FIG. 3, when the panel fastener is assembled, the retainer 64 is positioned about the reduced diameter section 62 of thumbscrew 54 shaft 58 and is positioned between flange 50 and the first end of ferrule 46 to compress spring 52 and hold thumbscrew 54 in the ferrule 46.

It is desirable to provide means to prevent loss of the spring 52 if screw 54 is removed. One approach is to provide means to retain the spring 52 within ferrule 46 if the screw 54 is removed. In one embodiment, this is done by slightly tapering the inner surface of ferrule 46 so that the end of the spring 52 forms a friction fit adjacent flange 50. Alternatively, the spring 52 may have a slightly enlarged coil near its end to form a friction fit within ferrule 46. Another alternative for preventing loss of spring 52 is to provide a means for retaining it within the cup shaped head 56 of the thumbscrew 54. This can be done by a friction fit arrangement as discussed above or the spring can have a reduced diameter coil on one end which can be threaded onto shaft 58 like the retainer 64.

As illustrated in FIG. 2, the panel fastener system of this embodiment includes at least one alternate thumbscrew 65 and mating retainer 66. The thumbscrew 65 differs from thumbscrew 54 only in the thread size carried on the end of its shaft 68. Likewise, retainer 66 differs from retainer 64 only in the thread size it is designed to engage. For example, a server 16 may be originally assembled with thumbscrews 54 having a thread size M6. However, it may be delivered with spare parts including a thumbscrew 65 and retainer 66 for thread size 10-32.

Figure 4:
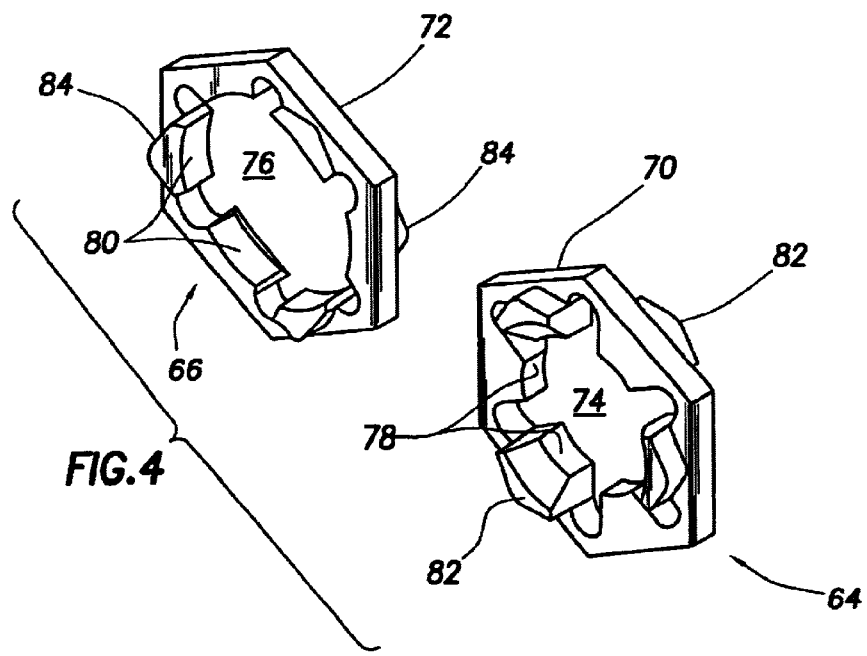
FIG. 4 is an enlarged illustration of retainers shown in FIGS. 2 and 3.

FIG. 4 illustrates more details of the retainers 64 and 66 of FIG. 2. In the present embodiment, the retainers 64, 66 are molded from a plastic, preferably nylon. Each retainer has a hexagonal outer circumference 70, 72 having a standard nut size. Each retainer has a hole 74, 76 having thread engaging inner surfaces 78, 80. The surfaces 78 and 80 are not threaded, but form a cylindrical surface slightly smaller than the mating threaded portions 60, 68 of thumbscrews 54, 65 of FIG. 2. Each retainer 64, 66 also has six lugs 82, 84, with three located on each side of the retainers. The outer edges of the lugs 82, 84 form three corners of a hexagonal pattern corresponding to a standard nut size which is smaller than the nut size corresponding to the outer circumferences 70, 72.

Figure 5:
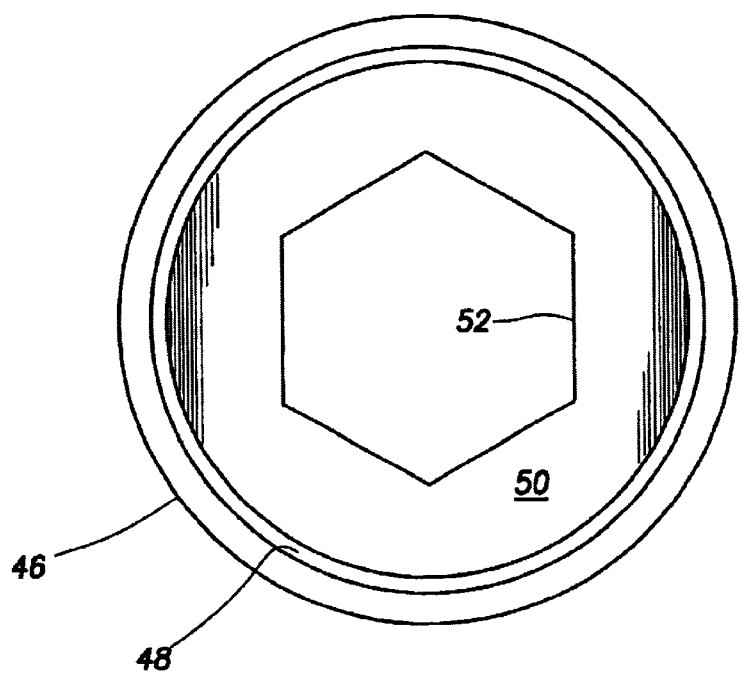
FIG. 5 is an enlarged end view of the ferrule shown in FIGS. 2 and 3.

FIG. 5 is an end view of the Ferrule 46 of FIGS. 2 and 3 as seen from the panel 40. The reduced diameter portion 48 is shown in its original shape before being swaged into panel 40. The interior flange 50 has a hexagonal shaped inner surface 52 which matches the size of the outer surfaces of lugs 82, 84 shown in FIG. 4. This size is therefore smaller than the dimensions of the hexagonal outer surfaces 70, 72 of retainers 64, 66 as shown in FIG. 4.

The hexagonal outer surfaces 70, 72 of retainers 64, 66 are useful in the original factory assembly of the panel fastener system. They allow standard factory tooling or robotics to screw retainers onto thumbscrews as if they were standard nuts. The hexagonal outer surfaces 70, 72 are not actually needed for the purposes of the present invention. The outer surfaces could be round or any other shape which would fit within the ferrule 46 and be large enough to not pass through the flange 50.

The lugs 82, 84 of retainers 64, 66 engage three of the corners of the flange 50 opening 52 to aid in the thread changing method described below. The lugs 82, 84 and hexagonal opening 52 provide a means for preventing relative rotation between the retainers 64, 66 and the ferrule 46. It should be apparent that the lugs 82, 84 and opening 52 could have other shapes which would allow engagement which would prevent relative rotation. For example, flange 50 inner surface 52 could be round with one or more notches and lugs 82, 84 could be sized and positioned to match the notch or notches. The inner surface 52 could be square and two or four matching lugs 82, 84 could be provided on retainers 64, 66.

It should also be appreciated that conventional threaded nuts could be used in place of retainers 64, 66 if desired. If standard nuts are used as retainers 64, 66, it is preferred that some means be provided to prevent relative rotation between the nuts and the ferrule 46. This could be done by providing a hexagonal recess in flange 50 which does not extend all the way through the flange 50.

If a customer wants to install a server 16 delivered with M6 thread size thumbscrews 54 into an equipment rack with size 10-32 threaded holes, it may quickly and easily convert the thumbscrews to the 10-32 size in the following way. To remove the originally installed thumbscrews, the user pulls back slightly on the thumbscrew 54 and turns it counterclockwise. Note that if a spring 52 is properly installed, it will hold the thumbscrew 54 in this starting position. When the lugs 82 of retainer 64 align with the ferrule 46 hexagonal opening 52, the lugs engage the opening and resist rotation of the retainer 64 relative to the ferrule 46. By continuing to pull back on the thumbscrew and turning it counterclockwise, threaded portion 60 engages the retainer and is turned all the way through retainer 64. At that point, the retainer is completely disengaged from thumbscrew 54. Then, the user simply removes the old thumbscrew 54 and retainer 64, leaving the spring 52 in place. The new thumbscrew 65 is then inserted into the ferrule 46 and pushed in against the spring 56 until the threaded end of the screw shaft is exposed on the panel end of the ferrule 46. The new retainer 66 is then manually held to the threaded end of the new thumbscrew 65. The user then turns the new thumbscrew 65 clockwise until the new retainer 66 engages the threaded section 68 and is threaded past the threaded section and down to the reduced diameter section.

While the above embodiment has been described with respect to two common rack mount screw sizes, namely 10-32 and M6, it is equally applicable to other screw thread configurations. Industry standards groups list various other screw thread sizes as accepted standards for rack mounts. For example the Electronic Industries Alliance accepts as standard thread systems 10-32, 12-24, M5 and M6. The system of the present invention may therefore include spare parts kits having a thumbscrew and retainer for each of the several standard rack thread sizes. One such kit would be provided for each of the thumbscrews originally installed on a server, i.e., two for a 1U server and four for a 2U server.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A panel fastener with interchangeable thread size comprising:

a ferrule having a first end adapted for engagement with a hole in a panel and having an interior flange between said first end and a second end;

a thumbscrew having a head and a shaft extending from said head, said shaft having a threaded portion near its end opposite said head and a reduced diameter portion intermediate said head and said threaded portion, said thumbscrew shaft carried within said ferrule with said threaded section of said thumbscrew being proximate said first end and said head of said thumbscrew being proximate said second end;

a retainer having a maximum dimension greater than the inner diameter of said interior flange of said ferrule, and having a hole sized to mate with threads on the thumbscrew threaded section, said retainer removably carried on the reduced diameter portion of said thumbscrew shaft between the thumbscrew threaded section and said interior flange of said ferrule; and means for preventing relative rotational movement between said retainer and said ferrule comprising
on said retainer, a set of three lugs having outer edges forming three points of a hexagonal pattern, and
on said ferrule flange, a hexagonal shaped inner surface sized to mate with said retainer lugs.

2. A rack mount panel fastener system having a kit for changing thread size comprising:

a ferrule having a first end adapted for engagement with a hole in a panel and having an interior flange between said first end and a second end;

a first screw having a head and a shaft extending from said head, said shaft having a threaded portion with a first thread size near its end opposite said head and a reduced diameter portion intermediate said head and said threaded portion;

a first retainer having a maximum dimension greater than the inner diameter of said ferrule interior flange, and having a hole sized to mate with said first thread size;

said first screw shaft carried within said ferrule with said threaded section being proximate said first end and said head being proximate said second end; and said first retainer carried on the reduced diameter portion of said first thumbscrew shaft between the first end of said ferrule and said interior flange; and a kit comprising:
a second screw having a head and a shaft extending from said head, said shaft having a threaded portion with a second thread size, different from said first thread size, near its end opposite said head and a reduced diameter portion intermediate said head and said threaded portion; and
a second retainer having a maximum dimension greater than the inner diameter of said ferrule interior flange, and having a hole sized to mate with said second thread size.

3. The system of claim 2 further comprising:

a plurality of third screws each having a head and a shaft extending from said head, each said shaft having a threaded portion near its end opposite said head and a reduced diameter portion intermediate said head and said threaded portion, each of said third screw threaded portions having thread sizes different from each other and from said first and second thread sizes, and a plurality of third retainers each having a maximum dimension greater than the inner diameter of said ferrule interior flange, and having a hole sized to mate with a thread size matching one of said third screws.

4. The system of claim 3 wherein:
  each of said first, second and third screws comprises a thumbscrew.

5. The system of claim 4 wherein the heads of said thumbscrews have knurled outer circumferences.

6. The system of claim 4 wherein the heads of said thumbscrews have a slip resistant material on their outer circumferences.

7. A rack mount computer server with a panel fastener system with interchangeable thread size comprising:
  a ferrule having a first end coupled to a hole in a server panel and having an interior flange between said first end of said ferrule and a second end of said ferrule;
  a first thumbscrew having a head and a shaft extending from said head, said shaft having a threaded portion with a first thread size near its end opposite said head and a reduced diameter portion intermediate said head and said threaded portion;
  a first retainer having a maximum dimension greater than the inner diameter of said interior flange of said ferrule, and having a hole sized to mate with said first thread size;
  said first thumbscrew shaft carried within said ferrule with said threaded section of said first thumbscrew being proximate said first end of said ferrule and said head of said first thumbscrew being proximate said second end of said ferrule;
  said first retainer removably carried on the reduced diameter portion of said thumbscrew shaft between said thumbscrew threaded portion and said interior flange; and
  a kit for changing thread size, comprising;
    a second screw having a head and a shaft extending from said head, said shaft having a threaded portion with a second thread size, different from said first thread size, near its end opposite said head and a reduced diameter portion intermediate said head and said threaded portion, and
    a second retainer having a maximum dimension greater than the inner diameter of said ferrule interior flange, and having a hole sized to mate with said second thread size.

* * * * *